United States Patent
Kugimaru et al.

(10) Patent No.: US 10,914,984 B2
(45) Date of Patent: *Feb. 9, 2021

(54) IMAGE DISPLAY APPARATUS AND SUPPORT PIN

(71) Applicant: Panasonic Intellectual Property Management Co., Ltd., Osaka (JP)

(72) Inventors: Tadahiro Kugimaru, Osaka (JP); Taizou Takeuchi, Osaka (JP); Takafumi Umitani, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/091,950

(22) PCT Filed: Feb. 6, 2018

(86) PCT No.: PCT/JP2018/004003
§ 371 (c)(1),
(2) Date: Oct. 5, 2018

(87) PCT Pub. No.: WO2018/147272
PCT Pub. Date: Aug. 16, 2018

(65) Prior Publication Data
US 2019/0137827 A1    May 9, 2019

Related U.S. Application Data

(60) Provisional application No. 62/456,939, filed on Feb. 9, 2017.

(30) Foreign Application Priority Data
Aug. 24, 2017    (JP) .................... 2017-161534

(51) Int. Cl.
*G02F 1/1333*    (2006.01)
*G02F 1/13357*    (2006.01)

(52) U.S. Cl.
CPC .. *G02F 1/133608* (2013.01); *G02F 1/133603* (2013.01); *G02F 1/133606* (2013.01);
(Continued)

(58) Field of Classification Search
CPC .. F16B 5/0607; F16B 5/06; F16B 2/20; F16B 2/205; F16B 5/065; G02F 2201/46;
(Continued)

(56) References Cited

U.S. PATENT DOCUMENTS 2,271,012 A    1/1942 Hutchings
8,218,107 B2    7/2012 Son et al.
(Continued)

FOREIGN PATENT DOCUMENTS

EP    2840440 A1    2/2015
JP    2005-316337 A    11/2005
(Continued)

OTHER PUBLICATIONS

International Search Report issued in International Application No. PCT/JP2018/004002 dated Apr. 24, 2018.
(Continued)

*Primary Examiner* — Rajarshi Chakraborty
*Assistant Examiner* — Fatima N Farokhrooz
(74) *Attorney, Agent, or Firm* — McDermott Will & Emery LLP (57) ABSTRACT

An image display apparatus includes: back frame light-emitting diodes (LEDs) disposed on a back frame; a luminance uniforming plate which makes uniform luminance of light emitted by the LEDs; a diffuser plate which is disposed on a front-surface side of the luminance uniforming plate and a support pin which is fixed to the back frame, extends
(Continued)

to penetrate through the luminance uniforming plate, and has a tip end that supports the diffuser plate. The support pin includes: a pedestal which is fixed to an opening portion formed in the back frame; and a support which includes the tip end, and extends from the pedestal toward a front-surface side. The pedestal includes a holding portion (first portion and second portion) which holds the back frame in a thickness direction of the back frame, and a portion of the holding portion on which the back frame is disposed is stepped.

3 Claims, 7 Drawing Sheets

(52) U.S. Cl.
CPC .............. *G02F 1/133611* (2013.01); *G02F 2001/133314* (2013.01)

(58) Field of Classification Search
CPC ... G02F 1/133608; G02F 2001/133322; G02F 1/133308; G02F 2001/133314; H01L 21/6875; B65D 45/16; E04F 15/02138; E04F 15/02127; Y10T 29/49954; G02B 6/0086; G02B 6/0088
See application file for complete search history.

(56) References Cited

U.S. PATENT DOCUMENTS

| | | | |
|---|---|---|---|
| 2005/0281050 A1 | 12/2005 | Chou | |
| 2006/0104080 A1 | 5/2006 | Kim et al. | |
| 2006/0215386 A1* | 9/2006 | Hatanaka | G02B 5/0242 362/97.1 |
| 2007/0070651 A1 | 3/2007 | Azuma et al. | |
| 2008/0106905 A1* | 5/2008 | Zhang | G02F 1/133608 362/311.06 |
| 2008/0159835 A1 | 7/2008 | Kwon | |
| 2008/0225556 A1* | 9/2008 | Chen | G02F 1/133608 362/634 |
| 2008/0285268 A1 | 11/2008 | Oku et al. | |
| 2009/0154139 A1* | 6/2009 | Shin | G02F 1/133608 362/97.1 |
| 2010/0008066 A1* | 1/2010 | Moro | G02F 1/133608 362/97.1 |
| 2010/0284172 A1* | 11/2010 | Yokota | G02F 1/133608 362/97.1 |
| 2011/0199754 A1 | 8/2011 | Hasegawa | |
| 2011/0242435 A1* | 10/2011 | Mouri | G02F 1/133604 348/739 |
| 2011/0317095 A1* | 12/2011 | Shimizu | G02F 1/133604 349/62 |
| 2012/0081634 A1* | 4/2012 | Yokota | G02F 1/133603 349/62 |
| 2012/0105739 A1 | 5/2012 | Shimizu | |
| 2012/0120325 A1* | 5/2012 | Shimizu | G02F 1/133608 348/790 |
| 2012/0133845 A1 | 5/2012 | Ikuta | |
| 2013/0188100 A1* | 7/2013 | Ikuta | F21V 7/04 348/739 |
| 2013/0194529 A1 | 8/2013 | Chang et al. | |
| 2013/0201663 A1* | 8/2013 | Cho | G02F 1/133608 362/97.2 |
| 2013/0215356 A1* | 8/2013 | Yu | G02B 6/0088 349/58 |
| 2014/0022763 A1 | 1/2014 | Matsui et al. | |
| 2014/0086704 A1* | 3/2014 | Hemingway | B29C 64/141 411/392 |
| 2015/0261042 A1 | 9/2015 | Sugaya | |
| 2016/0114738 A1* | 4/2016 | Klein | B60R 13/0206 24/292 |
| 2016/0223726 A1* | 8/2016 | Kwon | G02B 5/0278 |
| 2016/0377951 A1* | 12/2016 | Harris | G02F 1/16753 359/296 |
| 2018/0004034 A1* | 1/2018 | Shin | G02F 1/133608 |
| 2018/0107067 A1 | 4/2018 | Yamano et al. | |
| 2018/0107068 A1 | 4/2018 | Sasaki et al. | |

FOREIGN PATENT DOCUMENTS

| | | |
|---|---|---|
| JP | 2007-157451 A | 6/2007 |
| JP | 2009-211843 A | 9/2009 |
| JP | 2013-161793 A | 8/2013 |
| JP | 2014-22208 A | 2/2014 |
| JP | 2015-176780 A | 10/2015 |
| WO | 2010/052957 A1 | 5/2010 |
| WO | 2011/010488 A1 | 1/2011 |
| WO | 2011/016271 A1 | 2/2011 |
| WO | 2017/002307 A1 | 1/2017 |
| WO | 2017/002308 A1 | 1/2017 |

OTHER PUBLICATIONS

International Search Report issued in International Application No. PCT/JP2018/004003 dated Apr. 24, 2018.
Non-Final Office Action issued in U.S. Appl. No. 16/091,924, dated Jul. 26, 2019.
Extemded European Search Report issued in corresponding European Patent Application No. 18751074.8, dated Nov. 21, 2019.
Extemded European Search Report issued in corresponding European Patent Application No. 18751613.3, dated Nov. 21, 2019.
Non-Final Office Action issued in U.S. Appl. No. 16/091,924, dated Aug. 19, 2020.
European Office Action issued in European Patent Application No. 18 751 074.8, dated Sep. 9, 2020.

* cited by examiner

IMAGE DISPLAY APPARATUS AND SUPPORT PIN

CROSS REFERENCE

This application is the U.S. National Phase under 35 U.S.C. § 371 of International Application No. PCT/JP2018/004003 filed on Feb. 6, 2018, which claims the benefit of U.S. Provisional Application No. 62/456,939 filed Feb. 9, 2017 and Japanese Application No. 2017-161534 filed on Aug. 24, 2017, the entire contents of each are hereby incorporated by reference.

TECHNICAL FIELD

The present disclosure relates to an image display apparatus including a display panel such as a liquid-crystal cell, and a support pin included in the image display apparatus.

BACKGROUND ART

One example of an image display apparatus such as a liquid-crystal display apparatus includes a light source unit which emits light toward a display panel such as a liquid-crystal module, a luminance uniforming plate (light conductive reflector) which makes uniform luminance of the light emitted by the light source unit, a diffuser plate which diffuses the light of which the luminance is made uniform by the luminance uniforming plate, and a back frame which holds the display panel, the light source unit, the luminance uniforming plate, and the diffuser plate.

In addition, the image display apparatus as described above may include, behind the diffuser plate, a plurality of support pins for keeping the position of the diffuser plate (see, for example, Patent Literature (PTL) 1). The plurality of support pins are disposed on the back frame and penetrate through the luminance uniforming plate, thereby supporting the diffuser plate.

CITATION LIST

Patent Literature

PTL 1: Japanese Unexamined Patent Application Publication No. 2015-176780

SUMMARY OF THE INVENTION

Technical Problem

The present disclosure provides an image display apparatus capable of increasing manufacturing efficiency, by implementing support pin attachable to a plurality of back frames which are different in thickness.

Solutions to Problem

An image display apparatus according to the present disclosure includes: a back frame disposed on a rear-surface side of a display panel; a plurality of light-emitting diodes (LEDs) disposed on a front-surface side of the back frame; a luminance uniforming plate which is disposed on a front-surface side of the plurality of LEDs to cover the plurality of LEDs, and makes uniform luminance of light emitted by the plurality of LEDs; a diffuser plate which is disposed on a front-surface side of the luminance uniforming plate, and diffuses light transmitted through the luminance uniforming plate; and a support pin which is fixed to the back frame, extends to penetrate through the luminance uniforming plate, and has a tip end that supports the diffuser plate. In the image display apparatus according to the present disclosure, the support pin includes: a pedestal which is fixed to an opening portion formed in the back frame; and a support which includes the tip end, and extends from the pedestal toward a front-surface side of the display panel. The pedestal includes a holding portion which holds, in a sandwiching manner, the back frame in a thickness direction of the back frame, and a portion of the holding portion on which the back frame is disposed is stepped.

In addition, a support pin according to the present disclosure is included in an image display apparatus that includes: a back frame disposed on a rear-surface side of a display panel; a plurality of light-emitting diodes (LEDs) disposed on a front-surface side of the back frame; a luminance uniforming plate which is disposed on a front-surface side of the plurality of LEDs to cover the plurality of LEDs, and makes uniform luminance of light emitted by the plurality of LEDs; and a diffuser plate which is disposed on a front-surface side of the luminance uniforming plate, and diffuses light transmitted through the luminance uniforming plate. The support pin according to the present disclosure includes: a pedestal which is fixed to an opening portion formed in the back frame; and a support which extends from the pedestal toward a front-surface side of the display panel to penetrate through the luminance uniforming plate, and has a tip end that supports the diffuser plate. In the support pin according to the present disclosure, the pedestal includes a holding portion which holds, in a sandwiching manner, the back frame in a thickness direction of the back frame, and the holding portion is stepped.

Advantageous Effect of Invention

According to the present disclosure, it is possible to implement a support pin attachable to a plurality of back frames which are different in thickness, and to increase manufacturing efficiency of an image display apparatus.

DESCRIPTION OF EXEMPLARY EMBODIMENTS

The following describes an embodiment with reference to the drawings as necessary. However, unnecessarily detailed description will be omitted in some cases. For example, there are instances where detailed description of well-known matter and redundant description of substantially identical components may be omitted. This is to prevent the following description from being unnecessarily redundant and to facilitate understanding of those skilled in the art.

It should be understood that the accompanying Drawings and subsequent description are provided by the inventors to allow a person of ordinary skill in the art to adequately understand the present disclosure, and are thus not intended to limit the scope of the subject matter recited in the Claims.

In addition, in the embodiment below, the Y-axis directions correspond to the up and down directions, the Z-axis directions correspond to the back and front directions, and the X-axis directions correspond to the right and left directions, for convenience of description. However, such correspondences do not limit orientations of the image display apparatus according to present disclosure at the time of manufacturing or usage. In addition, in the description below, for example, an X-axis plus side refers to the direction of arrow of the X-axis, and an X-axis minus side refers to the side opposite to the X-axis plus side. The same holds true for the Y-axis direction and the Z-axis direction.

The following describes the embodiment with reference to FIG. 1 to FIG. 15. First, with reference to FIG. 1 and FIG. 2, a schematic configuration of an image display apparatus according to the embodiment will be described.

1-1. Schematic Configuration of Image Display Apparatus

Figure 1:
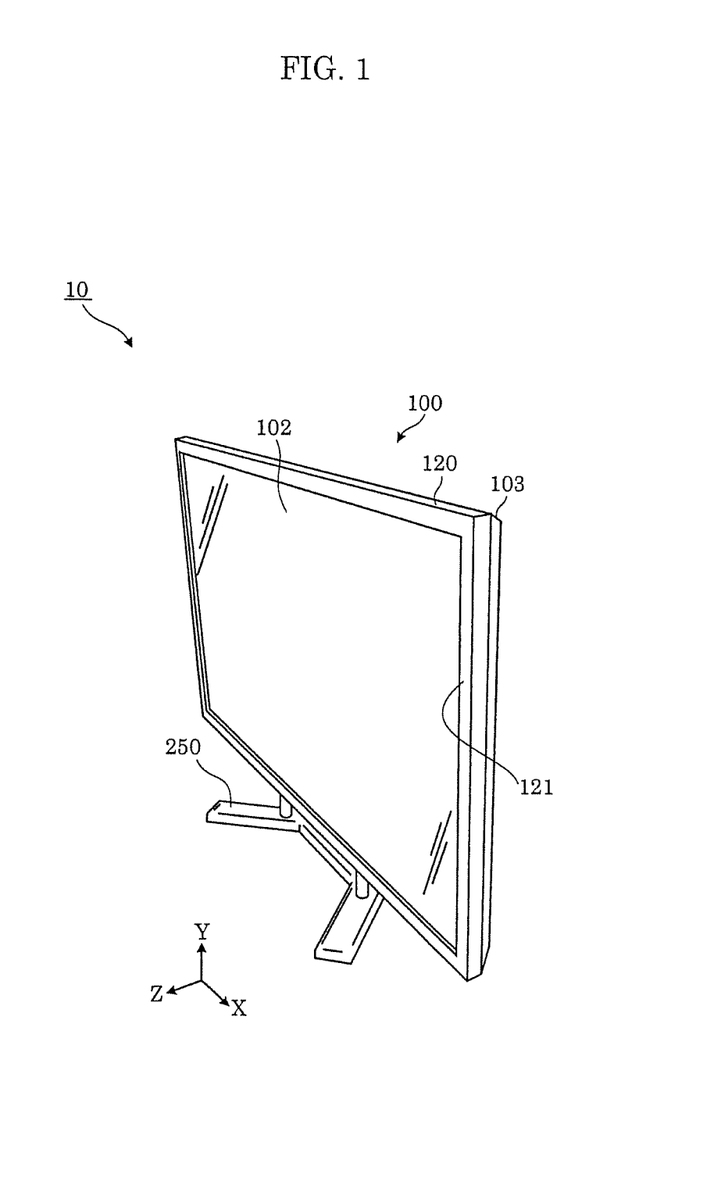
FIG. 1 is an external perspective view of an image display apparatus according to an embodiment.
Figure 2:
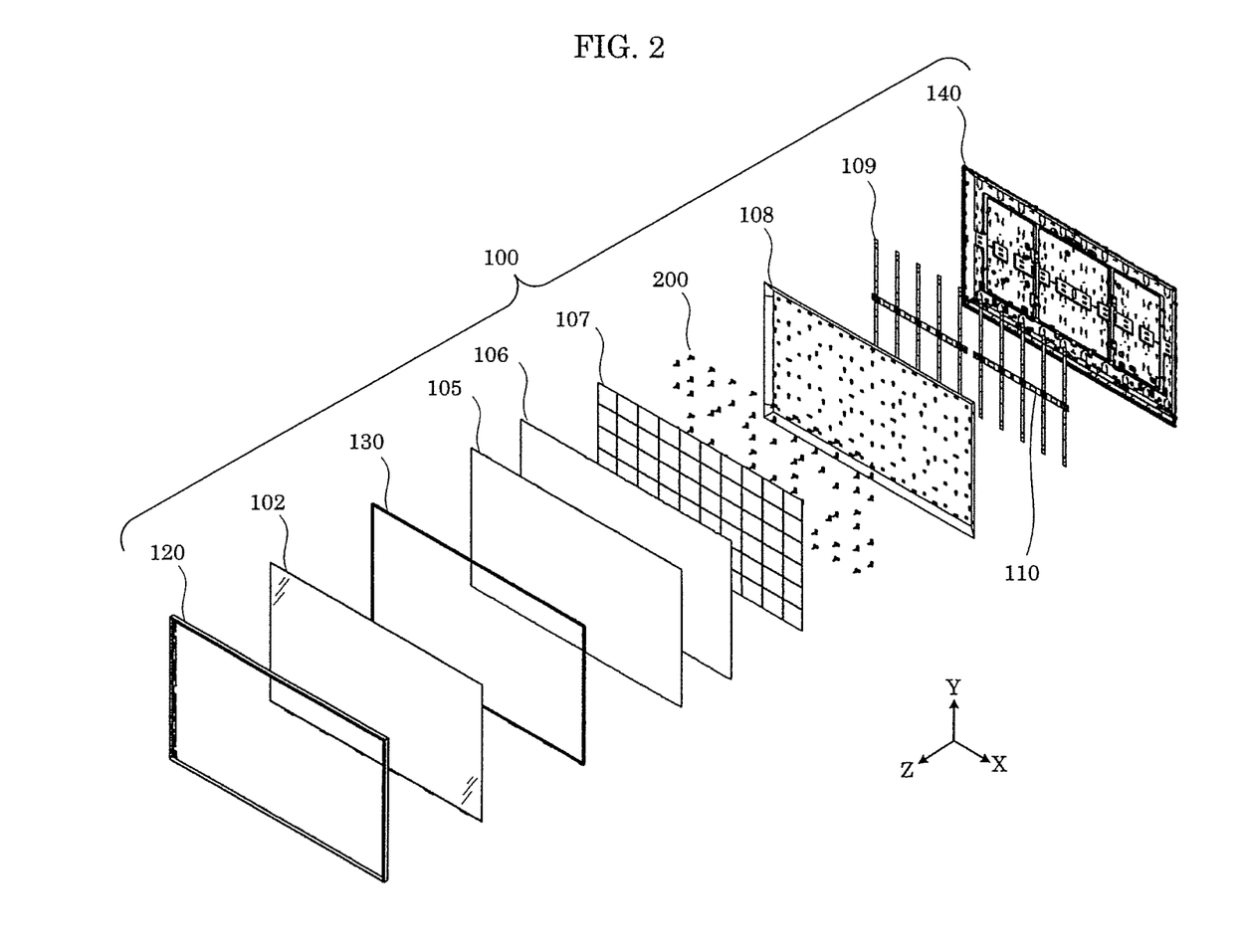
FIG. 2 is an exploded perspective view of a liquid-crystal module according to the embodiment.

FIG. 1 is an external perspective view of image display apparatus 10 according to the embodiment. FIG. 2 is an exploded perspective view of liquid-crystal module 100 according to the embodiment.

As illustrated in FIG. 1, image display apparatus 10 according to the present embodiment includes liquid-crystal module 100, back cover 103, stand 250 which supports liquid-crystal module 100.

Liquid-crystal module 100 is a device which displays a still image and video, and includes display panel 102 and bezel 120 provided along a peripheral edge of display panel 102. According to the present embodiment, display panel 102 is what is known as a liquid-crystal cell, and an element in which liquid crystal is contained between a plurality of glass plates. Display panel 102 is controlled according to an image signal input to liquid-crystal module 100, and displays an image. Liquid-crystal module 100 including display panel 102 that is a liquid-crystal cell is referred to as, for example, a liquid-crystal module, etc., in some cases.

As illustrated in FIG. 1, bezel 120 is a component which has front portion 121 located on a front-surface side of display panel 102, and is fixed to back frame 140 (see FIG. 2). In other words, bezel 120 is a component which protects periphery portions of elements such as display panel 102, etc., and forms a frame by front portion 121. According to the present embodiment, for example, resin such as polycarbonate (PC) or metal such as aluminum (Al), iron (Fe), etc. is employed as a material of bezel 120. Bezel 120 and back frame 140 sandwich the components from display panel 102 to back frame 140 therebetween.

Back cover 103 is a component that covers a rear surface of liquid-crystal module 100, and includes resin such as PC or metal such as aluminum (Al), iron (Fe), etc., as with bezel 120. It should be noted that back cover 103 may be a part of liquid-crystal module 100.

Liquid-crystal module 100 having the above-described configuration further includes: mold frame 130; optical sheet unit 105 including two or three optical sheets; diffuser plate 106; luminance uniforming plate 107; reflection sheet 108; LED sheet 109; relay sheet 110; back frame 140; and support pin 200, as illustrated in FIG. 2.

Mold frame 130 supports display panel 102. Mold frame 130 and back frame 140 sandwich a plurality of components from optical sheet unit 105 to LED sheet 109 and relay sheet 110 (what is known as a backlight).

Optical sheet unit 105 has a configuration in which two or three types of sheets having different optical properties are stacked. Optical sheet unit 105 includes, for example, a vertical prism sheet, a crosswise prism sheet, a diffuser sheet, etc.

Diffuser plate 106 diffuses light emitted from a plurality of LEDs 1091 (see FIG. 15) disposed on LED sheet 109. Luminance uniforming plate 107 makes uniform luminance of the light which is emitted from the plurality of LEDs 1091 disposed on LED sheet 109. Luminance uniforming plate 107 is also referred to as Flatter (registered trademark), for example. Luminance uniforming plate 107 is a component in which a plurality of openings 107a having different diameters (see FIG. 15) are provided. More specifically, in luminance uniforming plate 107, an opening with a significantly small diameter is formed directly above each of the plurality of LEDs 1091. The diameter of openings increases with an increase in distance from LED 1091. The above-described configuration allows luminance uniforming plate 107 to smooth distribution properties of light emitted from each of LEDs 1091.

Diffuser plate 106 further diffuses the light emitted from each of LEDs 1091 and having distribution properties smoothed by luminance uniforming plate 107. Accordingly, diffuser plate 106 emits light with less luminance unevenness.

Reflection sheet 108 is provided with openings 1081 (see FIG. 15, etc.) at positions corresponding to the plurality of LEDs 1091 disposed on LED sheet 109. LED sheet 109 is a flexible printed circuit board (FPC) on which the plurality of LEDs 1091 are disposed. Of two main surfaces of the FPC, one surface on which the plurality of LEDs 1091 are disposed is provided with a reflection layer. Of the two main surfaces of the FPC, the other surface is provided with a bonding layer. Relay sheet 110 is an FPC on which an electric path for supplying power, a control signal, etc., to the plurality of LEDs 1091 is formed. Relay sheet 110 is provided with a reflection layer, as with LED sheet 109.

Back frame 140 is made of a thin sheet metal, and supports LED sheet 109 and relay sheet 110. Back frame 140 is also referred to as a base plate, in some cases. More specifically, after LED sheet 109 and relay sheet 110 are attached to back frame 140, reflection sheet 108 is applied to back frame 140 such that LEDs 1091 are exposed respectively from the plurality of openings 1081. Light emitted from each of LEDs 1091 is reflected by the reflection layer disposed above the FPC and reflection sheet 108, and travels toward the Z-axis plus side.

Support pins 200 are mounted from above reflection sheet 108 such that support pins 200 and back frame 140 hold reflection sheet 108 therebetween. Support pins 200 extend to penetrate through luminance uniforming plate 107 in a state in which support pins 200 are fixed to back frame 140, and support diffuser plate 106 at tips thereof.

Luminance uniforming plate 107 is provided with a plurality of openings into which support pins 200 are inserted, and support pins 200 are inserted into the respective openings.

Diffuser plate 106 is supported by the tips of support pins 200, and supported by back frame 140 at the peripheral edge portion of diffuser plate 106.

Back frame 140 has one side including a cut-and-raised portion for hanging optical sheet unit 105. The one side of back frame 140 is an upper portion when image display apparatus 10 is installed. Optical sheet unit 105 includes a tab having a rectangular opening to be engaged with the above-described cut-and-raised portion.

In liquid-crystal module 100 having the above-described configuration, support pins 200 support diffuser plate 106 in such a manner that appearance of a dark portion is kept to a minimum.

1-2. Configuration of Support Pin

Next, support pin 200 will be described in detail.

Figure 3:
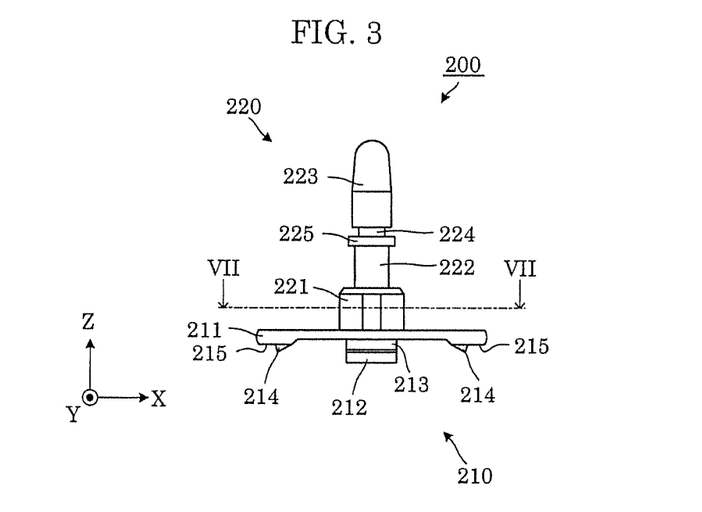
FIG. 3 is a front view which illustrates a schematic configuration of a support pin according to the embodiment.
Figure 4:
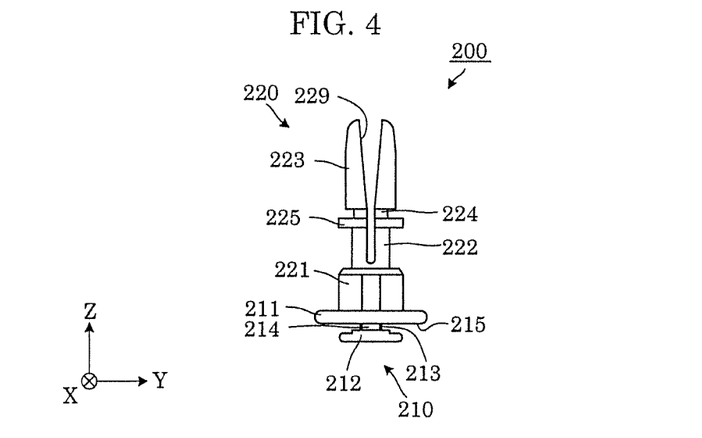
FIG. 4 is a side view which illustrates a schematic configuration of the support pin according to the embodiment.
Figure 5:
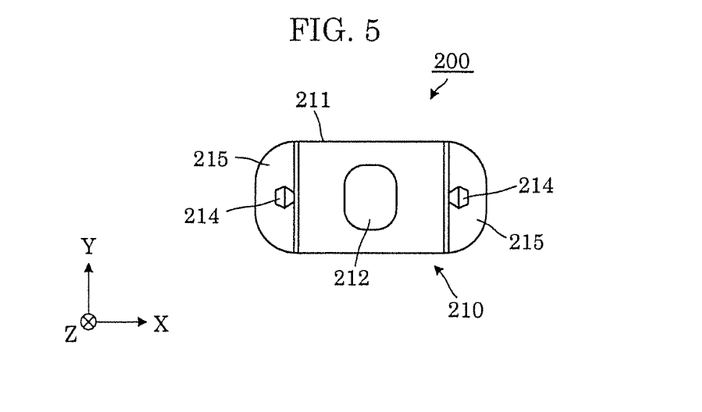
FIG. 5 is a bottom view which illustrates a schematic configuration of the support pin according to the embodiment.

FIG. 3 is a front view which illustrates a schematic configuration of support pin 200 according to the embodiment. FIG. 4 is a side view which illustrates a schematic configuration of support pin 200 according to the embodiment. FIG. 5 is a bottom view which illustrates a schematic configuration of support pin 200 according to the embodiment.

As illustrated in FIG. 3 to FIG. 5, support pin 200 is a resin component which includes pedestal 210 to be fixed to back frame 140, and support 220 extending from pedestal 210 toward the front-surface side of display panel 102.

Pedestal 210 includes first portion 211, second portion 212, and connecting portion 213.

First portion 211 is a plate portion which has an elliptic shape in a plan view, and is in contact with first surface 142 of back frame 140. More specifically, in the longitudinal direction of first portion 211 (X-axis direction according to the present embodiment), the center portion of first portion 211 is thin, and the end portions of first portion 211 are thick. As described above, since the center portion of first portion 211 is thin, first portion 211 is easily bent at the center portion. First portion 211 includes, at the end portions thereof, a pair of claws 214 which engage with opening portion 141 formed in back frame 140. Each of the pair of claws 214 has a triangular shape in a front view as illustrated in FIG. 3. In the triangular shape of claw 214, a side adjacent to the center portion of first portion 211 is tilted to a smaller degree than a side adjacent to the end portion of first portion 211. In addition, each of the pair of claws 214 has a hexagonal shape in a bottom view as illustrated in FIG. 5. Regions 215 which are the end portions, other than the pair of claws 214, of first portion 211 are in contact with first surface 142 of back frame 140.

Second portion 212 is a plate portion which has an elliptic shape in a plan view, and is in contact with second surface 143 of back frame 140. More specifically, the longitudinal direction of second portion 212 is a direction perpendicular to the longitudinal direction of first portion 211 (the Y-axis direction, according to the present embodiment). Second portion 212 is disposed within the center portion of first portion 211 in a plan view.

Figure 6:
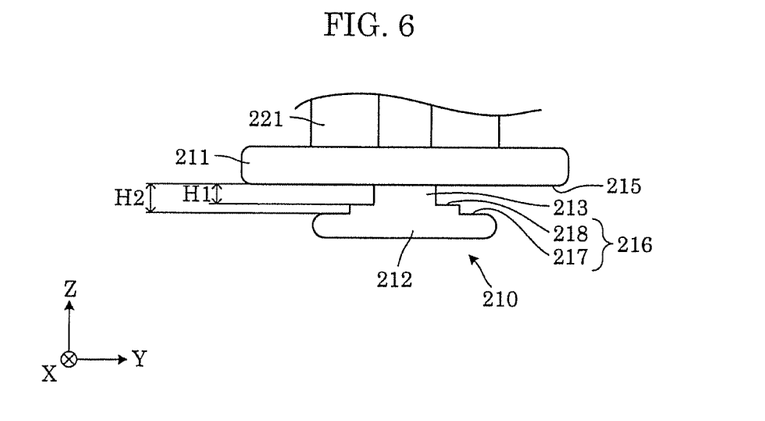
FIG. 6 is an enlarged side view of a second portion according to the embodiment.

FIG. 6 is an enlarged side view of second portion 212 according to the embodiment. As illustrated in FIG. 6, second portion 212 has surface 216 which faces first portion 211. Surface 216 is stepped. More specifically, surface 216 has a center portion that protrudes from end portions. The end portions of surface 216 is lower-step surface 217, and the center portion of surface 216 is upper-step surface 218. Space H2 between lower-step surface 217 and region 215 of first portion 211 is greater than space H1 between upper-step surface 218 and region 215 of first portion 211. Back frame 140 and back frame 140a are different in thickness, and each fitted in either space H1 or space H2 (see FIG. 11 and FIG. 14). When back frame 140 or back frame 140a is fitted in, first portion 211 and second portion 212 hold therebetween back frame 140 or back frame 140a in a thickness direction of back frame 140 or back frame 140a. In other words, first portion 211 and second portion 212 serve as a holding portion.

Connecting portion 213 is a rectangular column which connects first portion 211 and second portion 212. Connecting portion 213 extends from the center portion of first portion 211 to upper-step surface 218 of second portion 212. Connecting portion 213 is disposed in opening portions 141 and 141a of back frames 140 and 140a, respectively (see FIG. 11 and FIG. 14).

As illustrated in FIG. 3 and FIG. 4, support 220 includes base portion 221, middle portion 222, and tip portion 223.

Base portion 221 is an end portion of support 220 which is adjacent to pedestal 210. Base portion 221 is connected to the center portion of pedestal 210.

Figure 7:
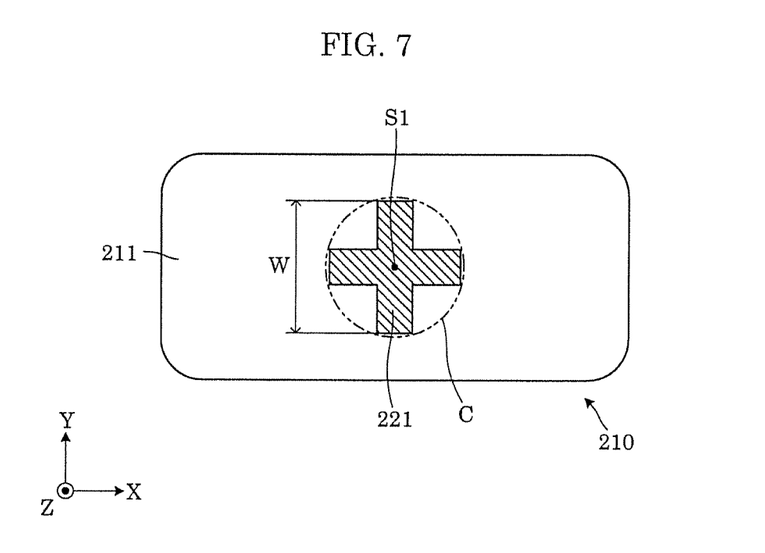
FIG. 7 is a cross-sectional view which illustrates a base portion of a support according to the embodiment.

FIG. 7 is a cross-sectional view which illustrates base portion 221 of support 220 according to the embodiment. More specifically, FIG. 7 is a cross-sectional view taken along VII-VII indicated in FIG. 3. As illustrated in FIG. 7, base portion 221 is formed radially about axis S1 of support 220 when viewed in the axis direction of support 220. More specifically, base portion 221 is formed into a cross shape when viewed in the axis direction of support 220. Here, the two-dot chain line indicated in FIG. 7 is virtual circle C having a diameter substantially equivalent to width W of base portion 221. The base portion of a support may have a cylindrical structure as indicated by virtual circle C, for example. However, with base portion 221 which is formed radially, it is possible to reduce materials while securing a certain level of strength.

It should be noted that base portion 221 may have a shape other than the cross shape, as long as base portion 221 is formed radially about axis S1 when viewed in the axis direction of support 220. Other examples of the shape of base portion 221 include, for example, a multiangular star shape, a Y-shape, etc.

Middle portion 222 is a portion between base portion 221 and tip portion 223. Middle portion 222 includes, at an end portion adjacent to tip portion 223, fitting portion 224 which has a cylindrical shape and is fitted in opening 107a of luminance uniforming plate 107. In addition, fitting portion 224 includes flange 225 at a position adjacent to middle portion 222. Flange 225 has an outer diameter larger than an outer diameter of fitting portion 224. Flange 225 prevents luminance uniforming plate 107 from moving toward base portion 221. In addition, a portion between flange 225 and base portion 221 in middle portion 222 is thinner than base portion 221.

Tip portion 223 is a portion supporting diffuser plate 106, and extends from middle portion 222 in the Z-axis direction. More specifically, a tip end of tip portion 223 has a shape of a convex curve, and the tip supports diffuser plate 106.

In addition, slit 229 which is parallel to a ZX plane is formed from the tip of tip portion 223 to a position halfway to middle portion 222. When tip portion 223 penetrates through opening 107a of luminance uniforming plate 107, external force is applied to tip portion 223 from luminance uniforming plate 107 via opening 107a. Since tip portion 223 is restrained by the external force, slit 229 is narrowed and tip portion 223 is thinner as a whole. Accordingly, tip portion 223 penetrates through opening 107a of luminance uniforming plate 107. In addition, tip portion 223 is released from restraint after tip portion 223 penetrates through opening 107a, and thus tip portion 223 elastically returns to the original shape. At this time, fitting portion 224 is fitted in luminance uniforming plate 107 through opening 107a.

1-3. Assembling of Support Pin and Back Frame

Next, assembling of support pin 200 and back frames 140 and 140a will be described.

Here, back frames 140 and 140a differ in thickness. More specifically, back frame 140 has a thickness corresponding to space H2, and back frame 140a has a thickness corresponding to space H1. In other words, back frame 140 has a greater thickness than back frame 140a.

1-3A. Back Frame 140

Figure 8:
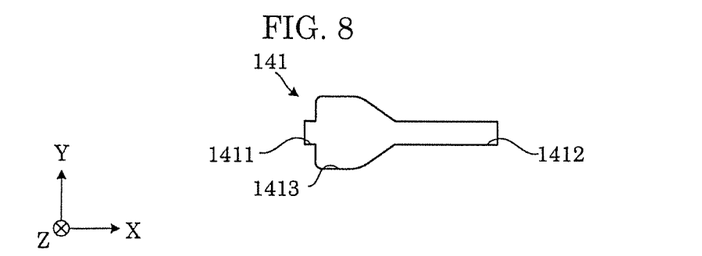
FIG. 8 is a plan view which illustrates a schematic configuration of an opening portion of a back frame according to the embodiment.

First, opening portion 141 of back frame 140 will be described. FIG. 8 is a plan view which illustrates a schematic configuration of opening portion 141 of back frame 140 according to the embodiment. Opening portion 141 is a through-hole elongated in the X-axis direction. Opening portion 141 includes first engagement opening 1411, second engagement opening 1412, and intermediate opening 1413. First engagement opening 1411 and second engagement opening 1412 are end portions of opening portion 141 in the longitudinal direction. In other words, first engagement opening 1411 and second engagement opening 1412 are a pair of edge portions located at opposing positions in the longitudinal direction. Intermediate opening 1413 is a portion between first engagement opening 1411 and second engagement opening 1412.

First engagement opening 1411 is one end of opening portion 141 in the longitudinal direction. First engagement opening 1411 protrudes, in a rectangular shape, from one end of intermediate opening 1413. One of the pair of claws 214 of support pin 200 engages with first engagement opening 1411.

Second engagement opening 1412 is the other end of opening portion 141 in the longitudinal direction. Second engagement opening 1412 protrudes, in a rectangular shape, from the other end of intermediate opening 1413. Second engagement opening 1412 protrudes to have a longer protrusion length than a protrusion length of first engagement opening 1411. The other of the pair of claws 214 of support pin 200 is guided into second engagement opening 1412 and engages with second engagement opening 1412. In addition, second engagement opening 1412 has a width same as width W1 of upper-step surface 218 of second portion 212, and upper-step surface 218 is fitted in second engagement opening 1412 (see FIG. 11).

Intermediate opening 1413 has a size that allows second portion 212 of support pin 200 to penetrate through in a non-contact manner. The other end of intermediate opening 1413 has an oblique shape in a plan view such that the width of intermediate opening 1413 gradually decreases toward second engagement opening 1412. The other end of intermediate opening 1413 serves as a guide portion for guiding upper-step surface 218 of second portion 212 into the second engagement opening 1412 at the time of attaching support pin 200 into opening portion 141.

Next, a procedure of attaching support pin 200 into opening portion 141 of back frame 140 will be described.

Figure 9:
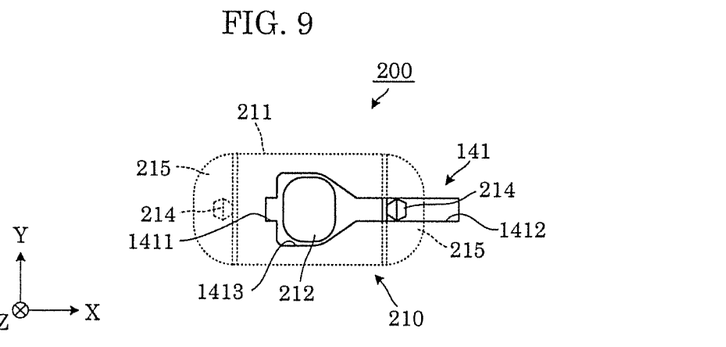
FIG. 9 is an explanatory diagram which illustrates a process of a procedure of assembling the support pin and the back frame according to the embodiment.
Figure 10:
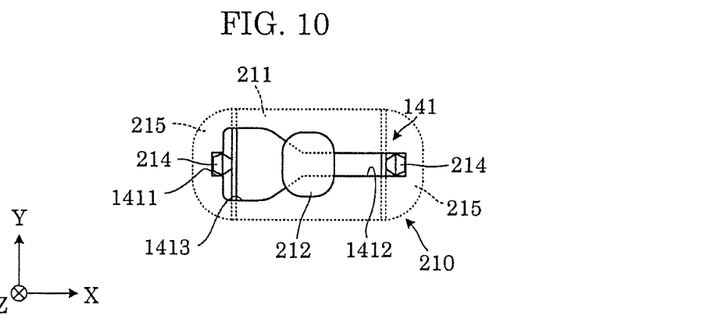
FIG. 10 is an explanatory diagram which illustrates a process of the procedure of assembling the support pin and the back frame according to the embodiment.
Figure 11:
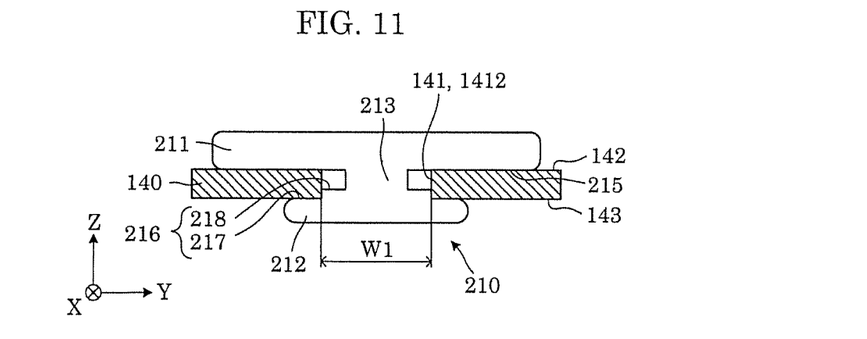
FIG. 11 is a side view of a pedestal of the support pin and the back frame according to the embodiment.

FIG. 9 and FIG. 10 are explanatory diagrams which illustrate a process of the procedure of assembling support pin 200 to back frame 140 according to the embodiment. FIG. 11 is a side view of pedestal 210 of support pin 200 and back frame 140 according to the embodiment. It should be noted that only back frame 140 is illustrated in a cross-sectional view in FIG. 11.

First, as illustrated in FIG. 9, an operator inserts the other of the pair of claws 214 of support pin 200 into second engagement opening 1412 of opening portion 141, and inserts second portion 212 into intermediate opening 1413. At this time, the operator bends the center portion of first portion 211 of support pin 200, thereby facilitating the above-described inserting operation.

Subsequently, as illustrated in FIG. 10, the operator slides the other of the pair of claws 214 along second engagement opening 1412, and thereby moves the other of the pair of claws 214 to a tip end potion of second engagement opening 1412. By doing so, the one of the pair of claws 214 also enters and engages with first engagement opening 1411.

In addition, when the other of the pair of claws 214 is slid, the other end of intermediate opening 1413 guides upper-step surface 218 of second portion 212 to second engagement opening 1412. Upper-step surface 218 is eventually fitted in second engagement opening 1412, as illustrated in FIG. 11. In this state, back frame 140 is fitted in space H2. More specifically, region 215 of first portion 211 is in contact with first surface 142 of back frame 140, and lower-step surface 217 of second portion 212 is in contact with second surface 143 of back frame 140. Accordingly, the holding portion (first portion 211 and second portion 212) holds back frame 140 between first portion 211 and second portion 212, in a sandwiching manner, in the thickness direction.

1-3B. Back Frame 140a

Figure 12:
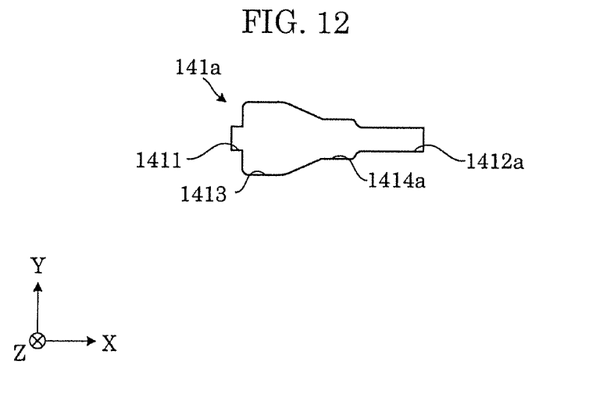
FIG. 12 is a plan view which illustrates a schematic configuration of an opening portion of another back frame according to the embodiment.

Next, opening portion 141a of back frame 140a that is a back frame different from back frame 140 will be described. FIG. 12 is a plan view which illustrates a schematic configuration of opening portion 141a of back frame 140a according to the embodiment. Opening portion 141a is different from opening portion 141 in that enlarged-width area 1414a is included in second engagement opening 1412a. Accordingly, in the description below, the same portions as opening portion 141 are assigned with the same reference signs, and the description for the same portions will be omitted.

Second engagement opening 1412a includes, at an end portion adjacent to intermediate opening 1413, enlarged-width area 1414a which has a width greater than the other portion of second engagement opening 1412a. The width of enlarged-width area 1414a is the same as width W2 of connecting portion 213 such that connecting portion 213 is fitted in enlarged-width area 1414a (see FIG. 14).

Here, support pin 200 is also attached to back frame 140a according to a procedure same as or similar to the above-described procedure applied to back frame 140.

Figure 13:
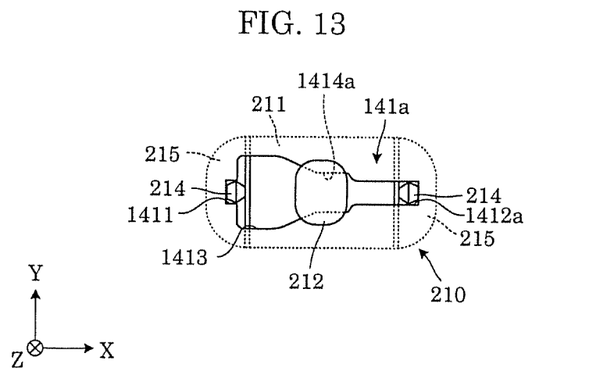
FIG. 13 is a bottom view which illustrates a process of a procedure of assembling the support pin and the other back frame according to the embodiment.
Figure 14:
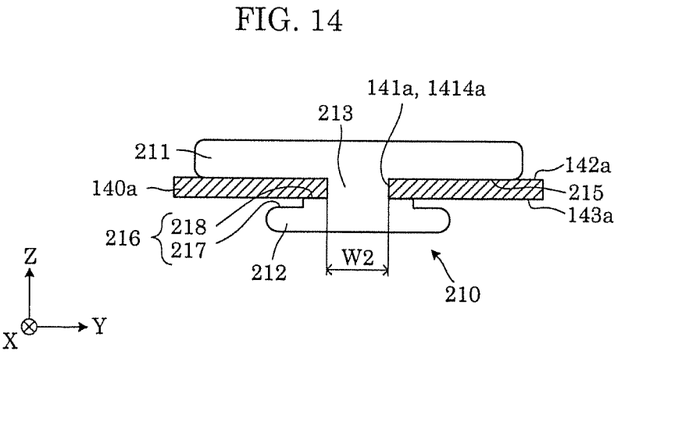
FIG. 14 is a side view which illustrates the pedestal of the support pin and the other back frame according to the embodiment.

FIG. 13 is a bottom view of pedestal 210 which illustrates a state after back frame 140a and support pin 200 are assembled together, according to the embodiment. FIG. 14 is a side view of pedestal 210 of support pin 200 and back frame 140a according to the embodiment. It should be noted that only back frame 140a is illustrated in a cross-sectional view in FIG. 14.

As illustrated in FIG. 13 and FIG. 14, after assembling, connecting portion 213 is fitted in enlarged-width area 1414a. In this state, back frame 140a is fitted in space H1. More specifically, region 215 of first portion 211 is in contact with first surface 142a of back frame 140a, and upper-step surface 218 of second portion 212 is in contact with second surface 143a of back frame 140a. Accordingly, the holding portion (first portion 211 and second portion 212) holds back frame 140a between first portion 211 and second portion 212, in a sandwiching manner, in the thickness direction.

It should be noted that, although the case where the longitudinal direction of opening portions 141 and 141a is the X-axis direction is described as an example, the longitudinal direction of opening portions 141 and 141a may be arbitrarily arranged in the XY plane.

1-4. Positional Relationship Between Support Pin and Surrounding Components

The following describes a positional relationship between support pin 200 and components disposed in proximity to support pin 200, after assembling, according to the embodiment.

Figure 15:
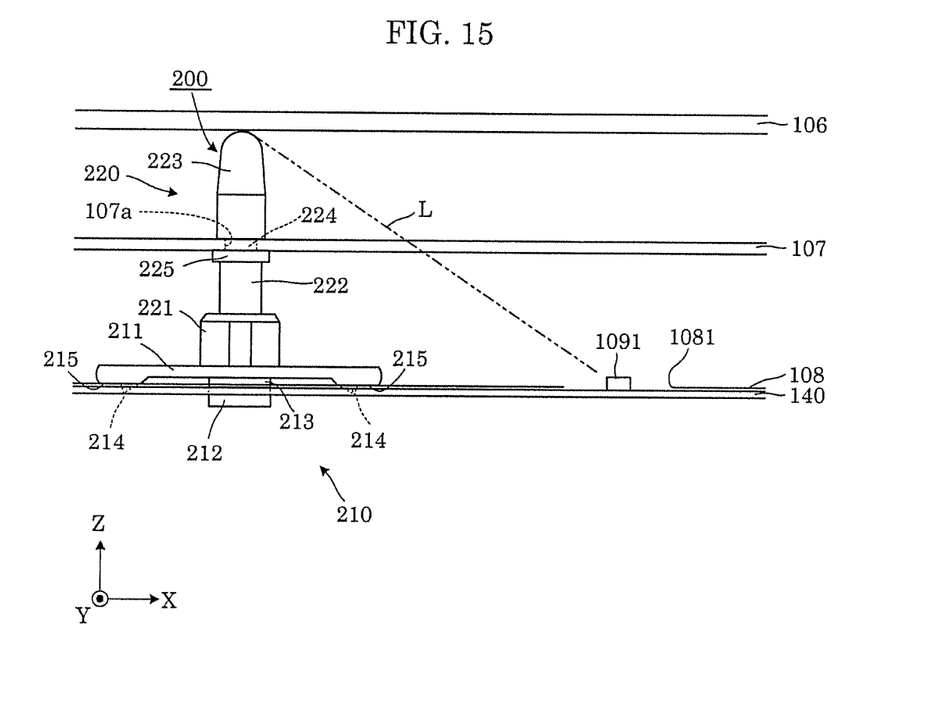
FIG. 15 is an explanatory diagram which illustrates a positional relationship between the support pin and components disposed in proximity to the support pin, according to the embodiment.

FIG. 15 is an explanatory diagram which illustrates a positional relationship between support pin 200 and components disposed in proximity to support pin 200, according to the embodiment.

As illustrated in FIG. 15, reflection sheet 108 is disposed on a front-surface side of back frame 140. A plurality of openings 1081 for individually exposing a plurality of LEDs 1091 of LED sheet 109 (illustration omitted) are provided in reflection sheet 108. Luminance uniforming plate 107 is disposed on a front-surface side of reflection sheet 108 with a predetermined space therebetween. Diffuser plate 106 is disposed on a front-surface side of luminance uniforming plate 107 with a predetermined space therebetween.

Support pin 200 includes support 220 which extends to penetrate through luminance uniforming plate 107 in a state in which support pin 200 is fixed to back frame 140. Support 220 includes fitting portion 224 which is fitted in opening 107a of luminance uniforming plate 107. In addition, a tip end of tip portion 223 of support 220 has a shape of a convex curve, and thus is in point contact with diffuser plate 106. In this manner, since the tip end of support pin 200 is in point contact with diffuser plate 106, light L emitted by LED 1091 is less likely to be blocked, and thus it is possible to inhibit production of a dark portion.

1-5. Advantageous Effect, and Others

As described above, image display apparatus 10 according to the present embodiment includes: back frame 140 or 140a disposed on a rear-surface side of display panel 102; a plurality of light-emitting diodes (LEDs) 1091 disposed on a front-surface side of back frame 140 or 140a; luminance uniforming plate 107 which is disposed on a front-surface side of the plurality of LEDs 1091 to cover the plurality of LEDs 1091, and makes uniform luminance of light emitted by the plurality of LEDs 1091; diffuser plate 106 which is disposed on a front-surface side of luminance uniforming plate 107, and diffuses light transmitted through luminance uniforming plate 107; and support pin 200 which is fixed to back frame 140 or 140a, extends to penetrate through luminance uniforming plate 107, and has a tip end that supports diffuser plate 106. In image display apparatus 10 according to the present embodiment, support pin 200 includes: pedestal 210 which is fixed to opening portion 141 or 141a formed in back frame 140 or 140a; and support 220 which includes the tip end, and extends from pedestal 210 toward a front-surface side of display panel 102. Pedestal 210 includes holding portion (first portion 211 and second portion 212) which holds, in a sandwiching manner, back frame 140 or 140a in a thickness direction of back frame 140 or 140a, and a portion of the holding portion on which back frame 140 or 140a is disposed is stepped.

In addition, support pin 200 according to the present embodiment is support pin 200 included in liquid-crystal module 100 that includes: back frame 140 or 140a disposed on a rear-surface side of display panel 102; a plurality of light-emitting diodes (LEDs) 1091 disposed on a front-surface side of back frame 140 or 140a; luminance uniforming plate 107 which is disposed on a front-surface side of the plurality of LEDs 1091 to cover the plurality of LEDs 1091, and makes uniform luminance of light emitted by the plurality of LEDs 1091; and diffuser plate 106 which is disposed on a front-surface side of luminance uniforming plate 107, and diffuses light transmitted through luminance uniforming plate 107. Support pin 200 according to the present embodiment includes: pedestal 210 which is fixed to opening portion 141 or 141a formed in back frame 140 or 140a; and support 220 which extends from pedestal 2101 toward a front-surface side of display panel 102 to penetrate through luminance uniforming plate 107, and has a tip end that supports diffuser plate 106. Pedestal 210 includes a holding portion which holds, in a sandwiching manner, back frame 140 or 140a in a thickness direction of back frame 140 or 140a, and the holding portion is stepped.

According to the above-described configuration, since a portion of the holding portion on which back frame 140 or 140a is disposed is stepped, spaces H1 and H2 having different sizes are formed in the holding portion. With this, it is possible to apply a single support pin 200 for back frames 140 and 140a which are different in thickness. It is thus possible to implement support pin 200 which is attachable to back frames 140 and 140a which are different in thickness.

In addition, the holding portion includes: first portion 211 which is in contact with first surface 142 or 142a of back frame 140 or 140a; and second portion 212 which faces first portion 211, and is in contact with second surface 143 or 143a of back frame 140 or 140a, and at least one of first portion 211 and second portion 212 is stepped.

According to the above-described configuration, since at least one of first portion 211 and second portion 212 is stepped, it is possible to form spaces H1 and H2 which are different in size with a simple configuration.

In addition, pedestal 210 includes a pair of claws 214 which engage with a pair of edge portions (first engagement opening 1411 and second engagement opening 1412, 1412a) located at opposing positions in opening portion 141 or 141a of back frame 140 or 140a.

According to the above-described configuration, since the pair of claws 214 of pedestal 210 respectively engage with the pair of edge portions located at opposing positions in opening portion 141 or opening portion 141a, it is possible to stably secure pedestal 210 to back frame 140 or 140a.

In addition, the tip end of support pin 200 has a shape of a convex curve.

According to the above-described configuration, since the tip end of support pin 200 which supports diffuser plate 106 has a shape of a convex curve, and thus the tip end of support pin 200 is in point contact with diffuser plate 106. It is thus possible to reduce the amount of light L blocked by support pin 200, making it possible to inhibit luminance unevenness. In addition, since support 220 does not have to be thinned as a whole, it is also possible to maintain the strength of support 220. As a result, it is possible to inhibit luminance unevenness caused by support pin 200 while maintaining the strength of support pin 200.

In addition, a plurality of support pins 200 support luminance uniforming plate 107 in a state in which the plurality of support pins 200 penetrate through luminance uniforming plate 107. There are instances where accumulation of dimensional tolerances or installation errors due to individual variability among support pins 200 causes slight misalignment in positional relationships between the plurality of openings 107a of luminance uniforming plate 107 and the plurality of support pins 200. When the plurality of support pins 200 are attached to luminance uniforming plate 107 while there is such misalignment, some support pins 200 may be tilted in some cases. Even when support pin 200 is tilted, the tip end of support pin 200 has a shape of a convex curve, and thus the tip end of support pin 200 is in point contact with diffuser plate 106. It is thus possible to inhibit luminance unevenness even when support pin 200 is tilted. Moreover, as described above, since the strength of support pin 200 is maintained, support pin 200 is less susceptible to damage even when external force in a direction in which support pin 200 is tilted is applied to support pin 200.

In addition, support pin 200 includes: pedestal 210 to be fixed to back frame 140 or 140a; and support 220 which includes the tip end, and extends from pedestal 210 toward a front-surface side of display panel 102. Support pin 200 includes, between pedestal 210 and a part (fitting portion 224) at which support 220 is fitted in luminance uniforming plate 107, a portion (portion between flange 225 and base portion 221) formed thinner than remaining portions (base portion 221) between pedestal 210 and the part.

According to the above-described configuration, since support 220 includes a portion formed thinner between fitting portion 224 and pedestal 210 than the remaining portion between fitting portion 224 and pedestal 210, support pin 200 is easily elastically deformed at the portion formed thinner. As described above, when external force in a direction in which support pin 200 is tilted is applied to support pin 200, the portion formed thinner is elastically deformed. In other words, the external force applied by luminance uniforming plate 107 is easily absorbed by support pin 200, and this it is possible to maintain planarity of luminance uniforming plate 107.

In addition, support 220 has an end portion (base portion 221) adjacent to pedestal 210, the end portion being formed radially about an axis of support 220 when viewed in an axis direction of support 220.

According to the above-described configuration, since base portion 221 is formed radially, it is possible to reduce materials while securing the strength of base portion 221.

In addition, the tip end of support 220 is split, and when support 220 penetrates through luminance uniforming plate 107, the tip end is restrained by luminance uniforming plate 107 and is thinner in comparison to a state before the tip end is restrained.

According to the above-described configuration, when restrained by luminance uniforming plate 107, support 220 having a split tip end is thinner in comparison to the state before support 220 is restrained. It is thus possible to smoothly attach support pin 200 to luminance uniforming plate 107.

2. Other Embodiments

As presented above, the embodiment has been described as an example of the techniques disclosed in the present application. However, the technique according to the present disclosure is not limited to the foregoing embodiments and modifications, and can also be applied to embodiments to which a change, substitution, addition, or omission is executed as necessary. Furthermore, it is possible to combine the structural components described in the above-described embodiment, into a new embodiment. In view of the above, the following describes other exemplary embodiments.

For example, an edge-lit backlight unit which emits light that is incident on an end surface of a light guide toward display panel 102 from a front surface of the light guide may be included in liquid-crystal module 100.

In addition, according to the present embodiment, image display apparatus 10 includes liquid-crystal module 100 as an apparatus which displays a still image and video. However, the configuration of liquid-crystal module 100 may be applied to, for example, a monitor display or the like for use in a personal computer.

In addition, according to the present embodiment, resin such as PC is employed for mold frame 130. However, metal such as steel use stainless (SUS) may be employed as a material for mold frame 130. When metal is employed for four sides (linear portions) of mold frame 130, four corners may be formed using resin rather than metal.

In addition, in the above-described embodiment, the case where second portion 212 of support pin 200 is stepped has been described as an example. However, it is also possible to form the second portion into a flat shape, and form the first portion into a stepped shape. Alternatively, each of the first portion and the second portion may be stepped.

In addition, the stepped shape of support pin 200 may be defined by three or more steps. With this, since three or more spaces which are different in size are formed, it is possible to implement a support pin which can be applied to larger number of types of back frames.

In addition, in the above-described embodiment, the case where support 220 includes a portion (i.e., a portion between flange 225 and base portion 221) formed thinner between fitting portion 224 and pedestal 210 than the remaining portion (base portion 221) between fitting portion 224 and pedestal 210 has been described as an example. However, the portion (i.e., a portion between flange 225 and base portion 221) may be formed to have a width equal to or larger than a width of the remaining portion (base portion 221).

In addition, in the above-described embodiment, the case where base portion 221 is formed radially has been described as an example. However, base portion 221 need not be formed radially. Other examples of the shape of the base portion include, for example, a polygonal shape, a circular shape, etc.

In addition, in the above-described embodiment, the case where support 220 has a split end has been described as an example. However, support 220 may have a shape without a split end.

As described above, exemplary embodiments have been described as exemplifications of the technique according to the present disclosure. The attached Drawings and the detailed descriptions are provided for that purpose.

Accordingly, the structural components described in the accompanying Drawings and the detailed description may include not only the structural components which are essential for solving the problems but also the structural components which are not essential for solving the problems but used for exemplifying the above-described techniques. As such, description of these non-essential structural components in the accompanying drawings and the detailed description should not be taken to mean that these non-essential structural components are essential.

Moreover, since the above-described embodiments show examples of the techniques according to present disclosure, various changes, substitutions, additions, omissions, and so on, can be carried out within the scope of the Claims or its equivalents.

INDUSTRIAL APPLICABILITY

The present disclosure is applicable to an image display apparatus which includes, for example, a support pin. More specifically, the present disclosure is applicable to a television receiver, a monitor display, a digital signage, a table-type display apparatus, etc.

The invention claimed is:

1. An image display apparatus, comprising:
a back frame disposed on a rear-surface side of a display panel, the back frame having a first surface on a front-surface side of the back frame, and a second surface opposite to, and parallel with, the first surface;
a plurality of light-emitting diodes (LEDs) disposed on the front-surface side of the back frame;
a luminance uniforming plate which is disposed on a front-surface side of the plurality of LEDs to cover the plurality of LEDs, and makes uniform luminance of light emitted by the plurality of LEDs;
a diffuser plate which is disposed on a front-surface side of the luminance uniforming plate, and diffuses light transmitted through the luminance uniforming plate; and
a support pin which is fixed to the back frame, extends to penetrate through the luminance uniforming plate, and has a tip end that supports the diffuser plate, wherein the support pin includes:
a pedestal which is fixed to an opening portion formed in the back frame; and
a support which includes the tip end, and extends from the pedestal toward a front-surface side of the display panel,
the pedestal includes
a first holding portion, and
a second holding portion having an upper step surface that is one single flat surface and a lower step surface surrounding the upper step surface, the upper step surface being closer to the surface of the first holding portion than the lower step surface,
the first holding portion and the second holding portion sandwiches the back frame, and one of the upper step surface and the lower step surface is in contact with the second surface of the back frame when the first holding portion and the second holding portion sandwiches the back frame.

2. The image display apparatus according to claim 1, wherein
the pedestal includes a pair of claws which engage with a pair of edge portions located at opposing positions in the opening portion of the back frame.

3. A support pin included in an image display apparatus that includes: a back frame disposed on a rear-surface side of a display panel, the back frame having a first surface on a front-surface side of the back frame, and a second surface opposite to, and parallel with, the first surface; a plurality of light-emitting diodes (LEDs) disposed on a front-surface side of the back frame; a luminance uniforming plate which is disposed on a front-surface side of the plurality of LEDs to cover the plurality of LEDs, and makes uniform luminance of light emitted by the plurality of LEDs; and a diffuser plate which is disposed on a front-surface side of the luminance uniforming plate, and diffuses light transmitted through the luminance uniforming plate, the support pin comprising: a pedestal which is fixed to an opening portion formed in the back frame; and a support which extends from the pedestal toward a front-surface side of the display panel to penetrate through the luminance uniforming plate, and has a tip end that supports the diffuser plate, wherein the pedestal includes a first holding portion, and a second holding portion having an upper step surface that is one single flat surface and a lower step surface surrounding the upper step surface, the upper step surface being closer to the surface of the first holding portion than the lower step surface, the first holding portion and the second holding portion sandwiches the back frame, and one of the upper step surface and the lower step surface is in contact with the second surface of the back frame when the first holding portion and the second holding portion sandwiches the back frame.

* * * * *